S. A. DOUGLAS.
VEHICLE TIRE.
APPLICATION FILED JULY 17, 1909.
975,220.
Patented Nov. 8, 1910.
2 SHEETS—SHEET 1.
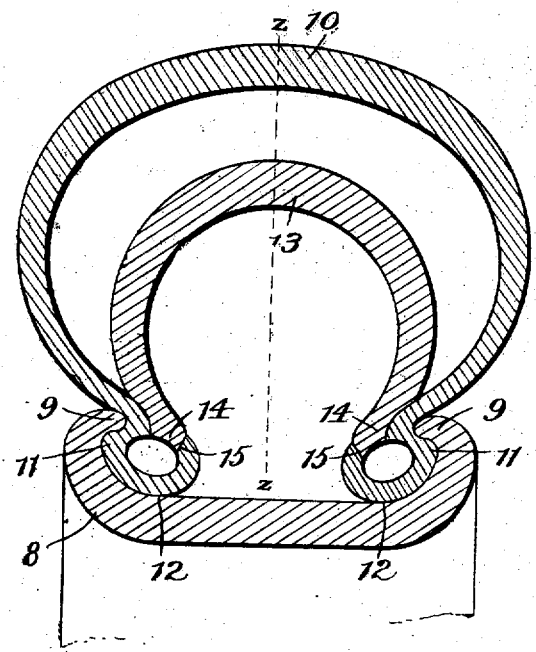
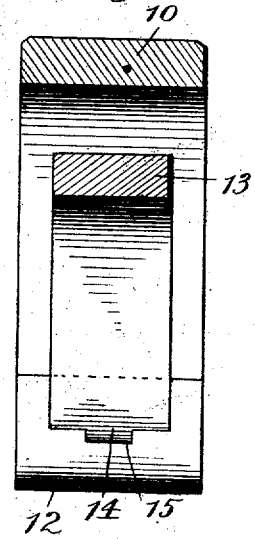
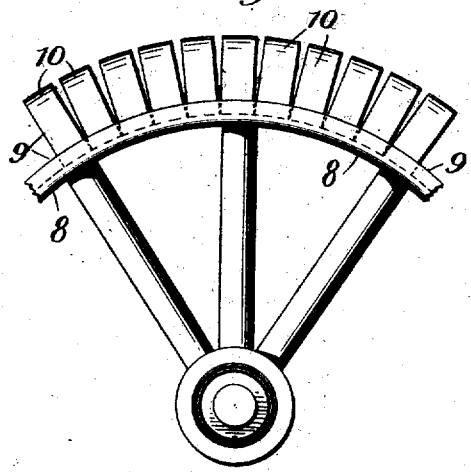
Witnesses:
Jas. E. Hutchinson
Carrie A. Krey
Inventor:
Stephen A. Douglas,
By Royal E. Burnham, Attorney.

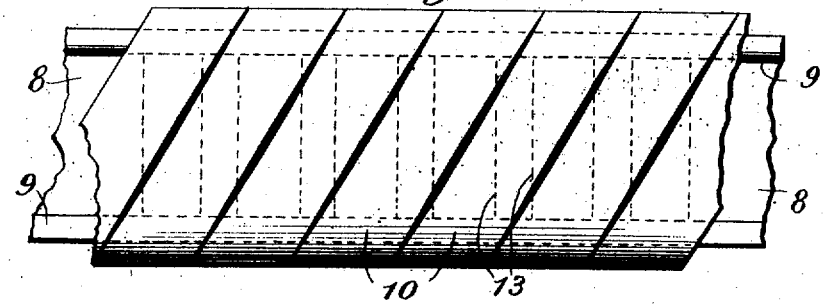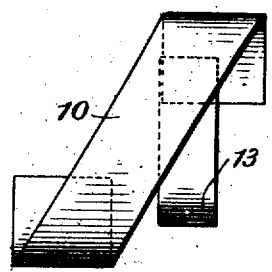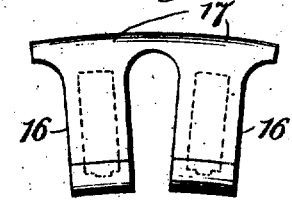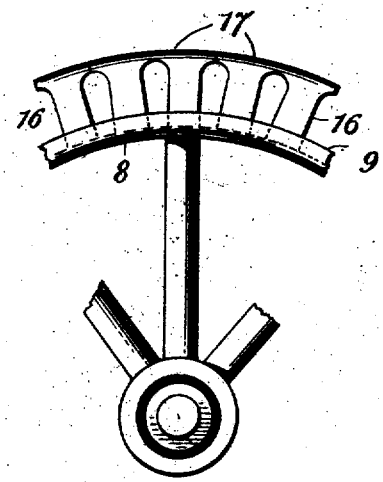

UNITED STATES PATENT OFFICE.

STEPHEN A. DOUGLAS, OF ARDMORE, OKLAHOMA, ASSIGNOR OF ONE-HALF TO CHARLES LEE ANDERSON, OF ARDMORE, OKLAHOMA.

VEHICLE-TIRE.

975,220.  Specification of Letters Patent.  Patented Nov. 8, 1910.

Application filed July 17, 1909. Serial No. 508,147.

*To all whom it may concern:*

Be it known that I, STEPHEN A. DOUGLAS, a citizen of the United States, residing at Ardmore, in the county of Carter and State of Oklahoma, have invented certain new and useful Improvements in Vehicle-Tires, of which the following is a specification, reference being had therein to the accompanying drawing.

The tire provided by this invention is of a form suitable to be made of metal, preferably of spring steel, it is durable, non-puncturable, and while it has sufficient resistive qualities to support heavy loads at the same time it has the resiliency necessary to comfortable riding.

The invention contemplates a tire formed of spring sections disposed radially around a wheel-rim and in contact with one another at the place of engagement with the rim, and a spreader member, constructed and disposed in a novel and efficient manner, is provided to insure the maintenance of reliable engagement of each section with the wheel-rim at all times and also to act as a buffer to prevent breakage of the tire section on rough roads or when carrying excessive loads.

The construction of the tire is such that it may readily be applied to wheel rims commonly in use with commercial rubber or other resilient tires, the necessity of changing existing rims for its use being obviated.

When read in connection with the description herein, the details of construction and arrangement of parts contemplated by the invention will be apparent from the accompanying drawings, forming part hereof, wherein embodiments of the invention are disclosed, for purposes of illustration.

While the embodiments of the invention shown in the drawings are preferred, it is to be understood that the several instrumentalities of which the invention consists can be variously organized, without departing in the least from the nature and spirit of the invention, and that the invention is not limited to the exact delineations herein made.

Like reference-characters refer to corresponding parts in the several views of the drawings, of which—

Figure 1 is a sectional view of one of the tire-sections, taken transversely of the wheel-rim; Fig. 2 is a sectional view, on the line z—z, Fig. 1; Fig. 3 is a view of a segment of a wheel having the tire applied thereto; Fig. 4 is a plan view illustrative of an oblique arrangement of tire-sections. Fig. 5 is a detail view of an oblique tire-section and spreader therefor; Fig. 6 is a view of a tire-section with plural supports; and Fig. 7 is a view of a segment of a wheel having this latter form applied thereto.

Referring more particularly to the drawings, 8 designates a form of wheel-rim, having inwardly projecting flanges 9, such as commonly used on automobiles and other road-vehicles.

A series of spring metal hollow sections 10, outwardly curved to approximate the tube-like formation of a rubber tire and of similar width throughout, are disposed around the rim and constitute the outer portion of the tire thereof, these sections abutting one another at the rim and being slightly separated at the periphery of the tire. The tread portion of each section is comparatively thick to withstand wear, and the sides are gradually reduced in thickness for the purpose of resiliency. The sides of each section are bent outwardly to form ridges 11, which engage under the flanges 9 of the rim, the section having a spring tendency to spread and to force the ridges against the flanges to retain it on the wheel-rim. The material of each section on each side then is continued downwardly from the ridge and inwardly and upwardly to bring the edge of the material against the inner surface of the section opposite or about opposite to the ridge 11, whereby beads 12 are formed, of which beads the ridges 11 may be considered as a part.

While the spring tendency of the tire-sections to wedge its beads against the sides of the rim is probably sufficient under normal conditions of service to reliably retain the sections in place, a spreader member 13 is provided to impose further gripping action of the beads against the flanges of the rim. This member is of substantially U-shaped form, having on each terminal a tenon 14 fitting into a mortise or recess 15 in a beaded portion of the tire-section. The mortise or recess of each beaded portion is preferably made by forming a slot in the end of the material before it is bent over against itself in the formation of the bead 12. The spreader member is made somewhat stronger than the tire-section and of less diameter than the section, and it has a spring action to force its ends against the beads of the section and to spread them out against the wheel-rim. The spreader is disposed within the section with enough space between it and the tread of the section to permit of the tread's depression under usual circumstances without engagement therewith. However, when excessive strain is imposed upon a section, its undue depression resulting therefrom is stopped and breakage prevented by its coming into contact with its spreader which then acts as a buffer.

In the form shown in Figs. 1, 2, and 3, and just described, the beads of a section seat directly opposite to each other in the wheel-rim, and this form is satisfactory in comparatively light service. In order, however, to efficiently support very heavy loads and to withstand the exacting conditions of hard usage to which the larger and more weighty road-vehicles are put, the invention also contemplates an oblique disposition of the tire-sections, of which Fig. 4 is an illustration, and in which each section, in the rotation of the wheel, gradually receives and relinquishes weight, thus obviating sudden depression and release. The spreaders used in the oblique arrangement are preferably disposed at about right angles to the circumference of the wheel-rim, as in the first form described, in order that there may be direct spreading exertion to force the beads into wedged engagement with the flanges of the rim and to avoid the sliding tendency with respect to the rim which would exist if the spreaders were disposed obliquely with the tire-sections. It will be obvious, of course, that in the oblique arrangement of the sections a spreader will engage one section on one side and another section on the other side. In the drawing, a spreader in engagement with a section on one side engages the adjacent section on the other side, but this is not necessarily always the case, as a spreader might jump or span one or more sections; dependent upon the angle of obliquity of the sections.

The invention also contemplates a tire section formed of two or more supporting portions 16, similar as to seat sides and spreaders to the tire-sections already described, and connected by a common tread portion 17, this form being illustrated in Figs. 6 and 7. The sections are arranged with the tread portions in engagement around the wheel-rim and the tread portions form a continuous tire adapted to heavy loads.

Having thus described my invention, what I claim as new, and desire to secure by Letters Patent, is—

1. A hollow metallic tire having beaded portions and recesses in the beaded portions, and a spreader of substantially U-shaped form in the tire having tenons seated in said recesses, said spreader being arranged to force the beaded portions of the tire against the flanges of a wheel-rim.

2. The combination with a hollow tire having beaded portions formed with recesses, of a substantially U-shaped spreader of spring material in the tire formed with tenons on its terminals, said tenons seating in said recesses, and said spreader being arranged to force said beaded portions against flanges of a wheel-rim.

3. A hollow tire formed with a series of recesses in each of its sides, and a series of substantially U-shaped spreaders of spring material radially arranged in the tire, one end of each spreader being seated in a recess in one side of the tire and the other end being seated in a recess in the other side of the tire, and each spreader operating by spring tendency of its material to spread its ends and thereby force the sides of the tire against flanges of a wheel-rim.

In testimony whereof I affix my signature in presence of two witnesses.

STEPHEN A. DOUGLAS.

Witnesses:
ROYAL E. BURNHAM,
CHARLES J. KAPPLER.